US009360242B2

(12) United States Patent
Muren

(10) Patent No.: US 9,360,242 B2
(45) Date of Patent: Jun. 7, 2016

(54) METHODS, SYSTEMS, AND DEVICES FOR PRODUCING A HEAT PUMP

(71) Applicant: REbound Technology LLC, Boulder, CO (US)

(72) Inventor: Russell Muren, Boulder, CO (US)

(73) Assignee: Rebound Technologies, Inc., Denver, CO (US)

( * ) Notice: Subject to any disclaimer, the term of this patent is extended or adjusted under 35 U.S.C. 154(b) by 256 days.

(21) Appl. No.: 14/280,080

(22) Filed: May 16, 2014

(65) Prior Publication Data

US 2014/0338372 A1    Nov. 20, 2014

Related U.S. Application Data

(60) Provisional application No. 61/824,620, filed on May 17, 2013.

(51) Int. Cl.
*F25B 30/04* (2006.01)
*F25B 15/02* (2006.01)
*F25B 27/00* (2006.01)

(52) U.S. Cl.
CPC ............... *F25B 30/04* (2013.01); *F25B 15/02* (2013.01); *F25B 27/007* (2013.01); *Y02B 30/62* (2013.01)

(58) Field of Classification Search
CPC ......... F25B 30/04; F25B 15/02; F25B 27/007
USPC .......................................................... 62/101
See application file for complete search history.

(56) References Cited

U.S. PATENT DOCUMENTS

| 4,822,391 | A | * | 4/1989 | Rockenfeller | F24J 1/00 62/376 |
| 5,207,075 | A | * | 5/1993 | Gundlach | F24F 5/0017 237/2 B |
| 5,941,089 | A | * | 8/1999 | Takaishi | F25B 15/02 237/2 B |

* cited by examiner

*Primary Examiner* — Emmanuel Duke
(74) *Attorney, Agent, or Firm* — Wilson Patent Law, LLC

(57) ABSTRACT

Methods, systems, and/or devices are provided for producing a heat pump. In some embodiments, the heat pump may be driven by low temperature heat. The methods, systems, and devices may include tools and techniques for: precipitating a first material, where heat may be released from the precipitated first material; cooling the precipitated first material; dissolving the cooled precipitated first material into a second material to create a dissolved mixture, where heat may be absorbed into the mixture; and/or separating the first material and the second material from the dissolved mixture.

20 Claims, 14 Drawing Sheets

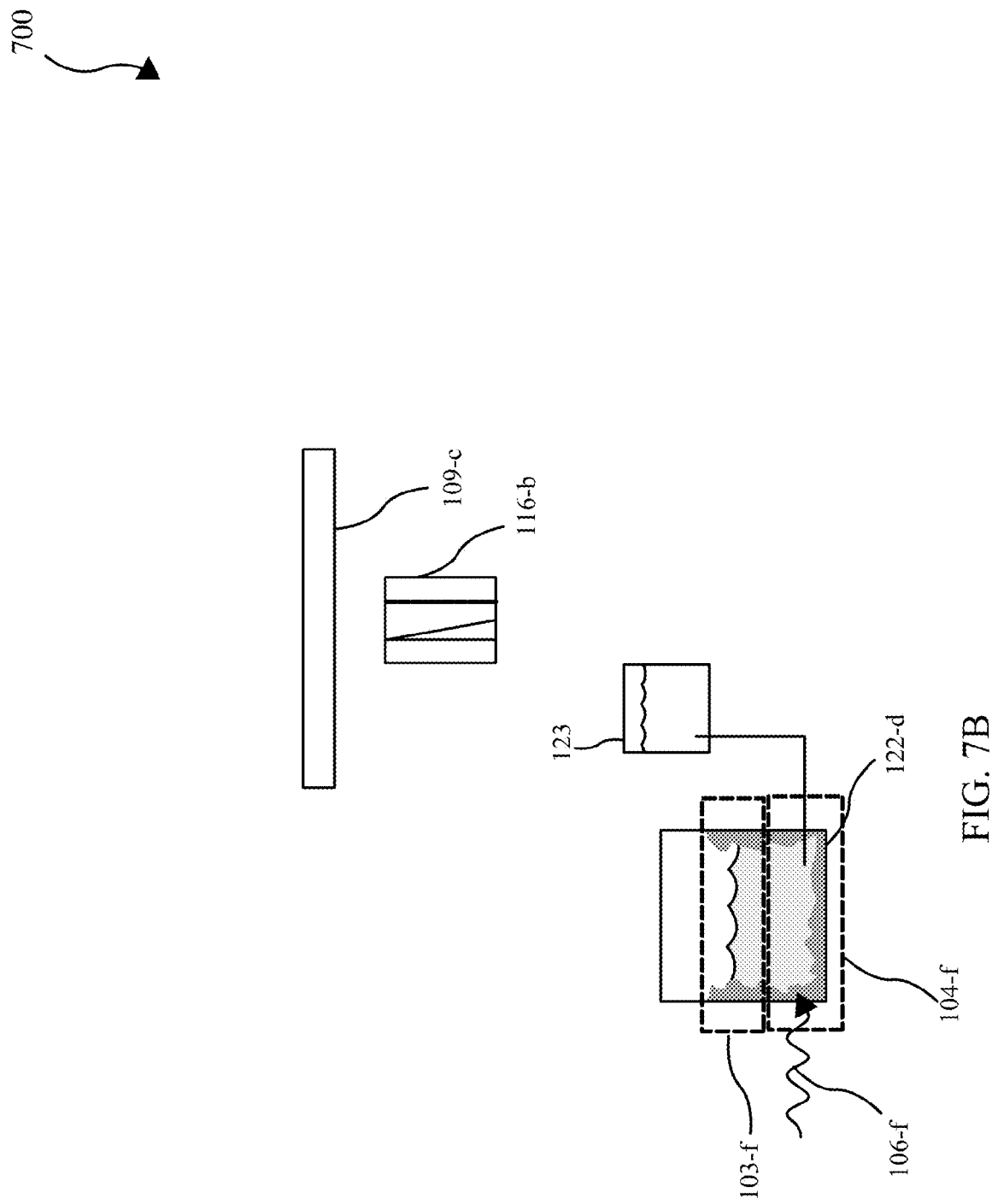

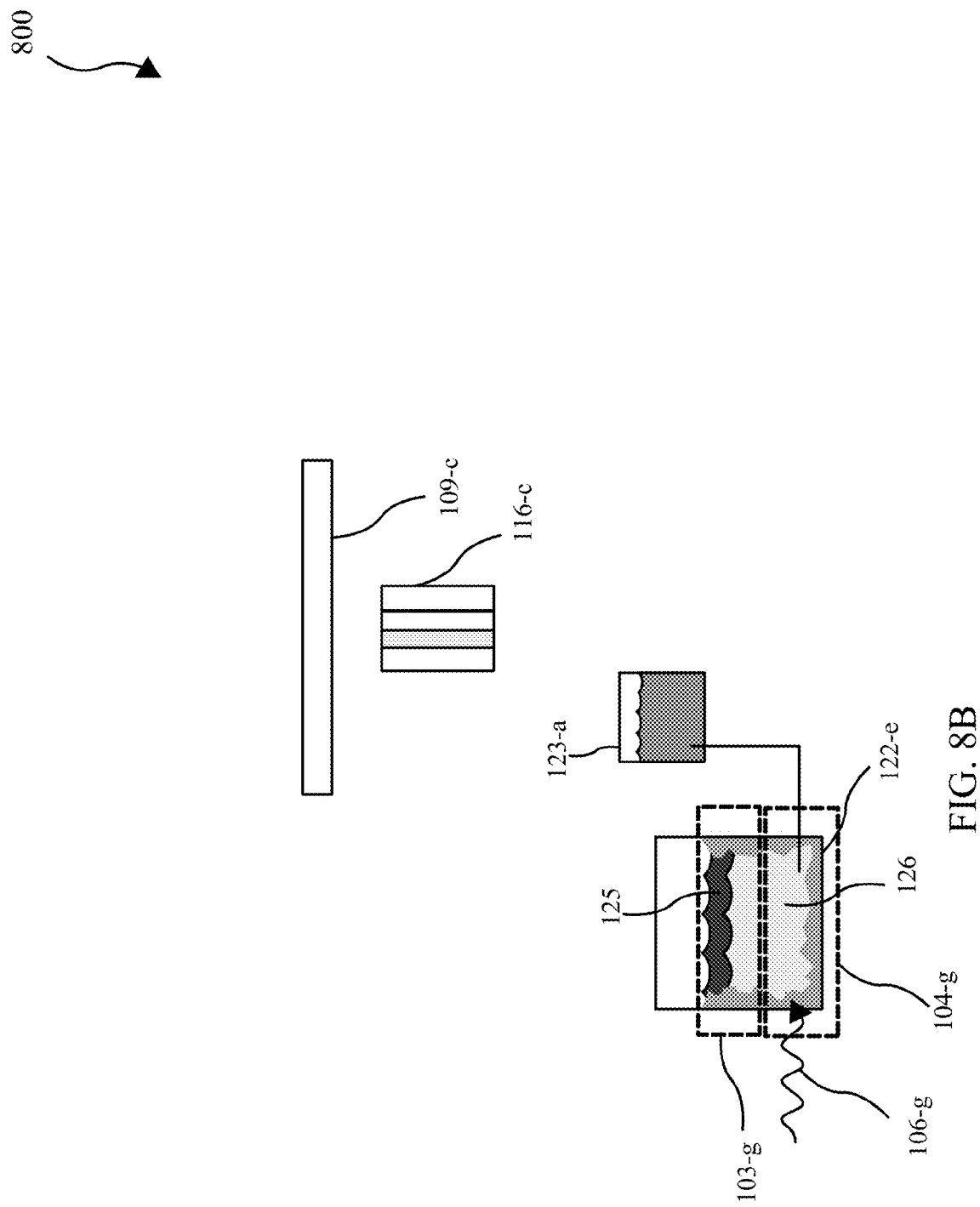

METHODS, SYSTEMS, AND DEVICES FOR PRODUCING A HEAT PUMP

CROSS-REFERENCES TO RELATED APPLICATIONS

This application is a non-provisional patent application claiming priority benefit of U.S. provisional patent application Ser. No. 61/842,620, filed on May 17, 2013 and entitled "METHODS, SYSTEMS, AND DEVICES FOR LOW TEMPERATURE DRIVEN HEAT PUMP," the entire disclosure of which is herein incorporated by reference for all purposes.

BACKGROUND

The technical field of the invention may include methods, systems, and devices that may be used to produce a heat pump effect. A heat pump is generally any device that may use an energetic input to produce a flow of heat from a low temperature to a hot temperature. In nature, heat transfer generally occurs from hot to cold. A hot drink cooling to room temperature via release of its own heat is an example of this natural process. A heat pump may utilize additional energy to reverse this naturally occurring process and move heat from cold to hot. A refrigerator keeping its insulated internal compartment cool by removing heat via a vapor compression heat pump may be an example of this phenomenon.

The energy involved to power a heat pump may come in chemical, mechanical, thermal, or electrical form, for example. Regardless of the source of the energy driving the heat pump, the general approach of all heat pumps is generally the same: cause a spontaneous processes that naturally occurs in a set order dictated by the natural flow of heat from hot to cold to occur in the reverse order. An example is today's widely used vapor compression system that forces a refrigerant to boil at a low temperature and condense at a high temperature through modification of its pressure via a mechanically driven compressor.

SUMMARY

Methods, systems, and devices are provided for producing a heat pump. In some case, the heat pump may be driven by a low temperature heat. Some embodiments produce the heat pump without the use of vapor-phase refrigerants.

For example, some embodiments include a method of producing a heat pump. This may be driven by low temperature heat in some cases. The method may include precipitating a first material. Heat may be released from the precipitated first material. This heat may be referred to as a first heat in some embodiments. The precipitated first material may be cooled. The cooled precipitated first material may be dissolved into a second material to create a dissolved mixture. Heat may be absorbed into the mixture. This heat may be referred to as a second heat in some embodiments. The first material and the second material may be separated from the dissolved mixture. Some embodiments of the method may include utilizing at least a portion of the dissolved mixture to perform the cooling of the precipitated first material.

In some embodiments of the method, the first material includes a refrigerant and the second material includes a solvent. The first material may be in thermal contact with an ambient environment when precipitating. The first material may be in thermal contact with a refrigerated environment when at least cooling or dissolving.

In some embodiments of the method, the precipitating utilizes at least a liquid thermocline, a priller, or a heat exchanger. For example, some embodiments may utilize at least an inert liquid thermocline, an inert forced gas priller, an inert natural draft priller, or an inhibited surface heat exchanger. The cooling may utilize a heat exchanger in some cases. For example, the cooling may utilize at least an indirect contact heat exchanger or a direct contact heat exchanger.

In some embodiments of the method, heat, such as the second heat, is absorbed into the dissolved mixture through removing heat from a refrigerated environment. This may be through at least direct thermal contact with a refrigerant or indirect thermal contract with a secondary heat transfer fluid. The separation may utilize a variety of different techniques including, but limited to, at least a membrane distillation, an ion exchange, an activated carbon absorption, a flash separation, a distillation, a multi-effect distillation, a vapor compression distillation, an evaporation, air-gap membrane extraction, or a liquid-liquid extraction.

In some embodiments of the method, the solvent includes at least water, alcohol, glycol, ammonia, dimethyl sulfoxide (DMSO), acetone, polyethylene glycol (PEG), aqueous polymer, or polar solvent. In some cases, the solvent may include a combination of solvents, such as water and at least one other solvent. The refrigerant may include a hydrate forming salt. In some embodiments, the refrigerant includes at least $Na_2S_2CO_3$, $Na_2CO_3$, $NA_2Cr0_4$, or $KNO_3$.

Some embodiments include a system for producing a heat pump. In some cases, the system for producing the heat pump may be driven by low temperature heat. The system may include means for precipitating a first material. Heat, such as a first heat, may be released from the precipitated first material. The system may include means for cooling the precipitated first material. The system may include means for dissolving the cooled precipitated first material into a second material to create a dissolved mixture. Heat, such as a second heat, may be absorbed into the mixture. The system may include means for separating the first material and the second material from the dissolved mixture.

Some embodiments may include a system for producing a heat pump that may include a precipitator and/or a separator. Some embodiments of the system may also include a heat collector, which may be coupled with the separator in some cases. In some embodiments of the system, the precipitator may be configured to precipitate a first material. Heat, such as a first heat, may be released from the precipitated first material. The precipitator may be configured to cool the precipitated first material. The precipitator may be configured to dissolve the cooled precipitated first material into a second material to create a dissolved mixture. Heat, such as a second heat, may be absorbed into the mixture. In some embodiments, the system may include a separator configured to separate the first material and the second material from the dissolved mixture.

In some embodiments of the system, the first material includes a refrigerant and the second material includes a solvent. In some embodiments, the precipitator includes a heater exchanger configured to cool the precipitated first material. In some embodiments, the separator includes a distiller configured to separate the first material and the second material from the dissolved mixture.

In some embodiments of the system, the precipitator may include a liquid thermocline configured to precipitate the first material. Heat, such as a first heat, may be released from the precipitated first material. In some embodiments, the precipitator may include a priller configured to precipitate the first material; heat, such as a first heat, may be released from the precipitated first material.

In some embodiments of the system, the precipitator may include one or more tanks. At least one of the tanks may include one or more faceted surface areas in some cases. In some embodiments, the separator, which may be referred to as a distiller in some cases, may include at least a direct contact membrane distiller, an ion exchanger, an activated carbon absorber, a flash separator, a multi-effect distiller, a vapor compression distiller, an evaporator, an air-gap membrane contractor, or a liquid-liquid extractor.

Some embodiments include systems, methods, and/or devices as described in the specification and/or shown in the figures.

The embodiments may not capture the full extent of combination and permutations of materials and process equipment. However, they may demonstrate the range of applicability of the method, devices, and/or systems. The different embodiments may utilize more or less steps than those described. The different embodiments may also utilize aspects of each other.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 7A and 7B show a system for producing a heat pump in accordance with various embodiments.

FIGS. 8A and 8B show a system for producing a heat pump in accordance with various embodiments.

DETAILED DESCRIPTION

Figure 1A:
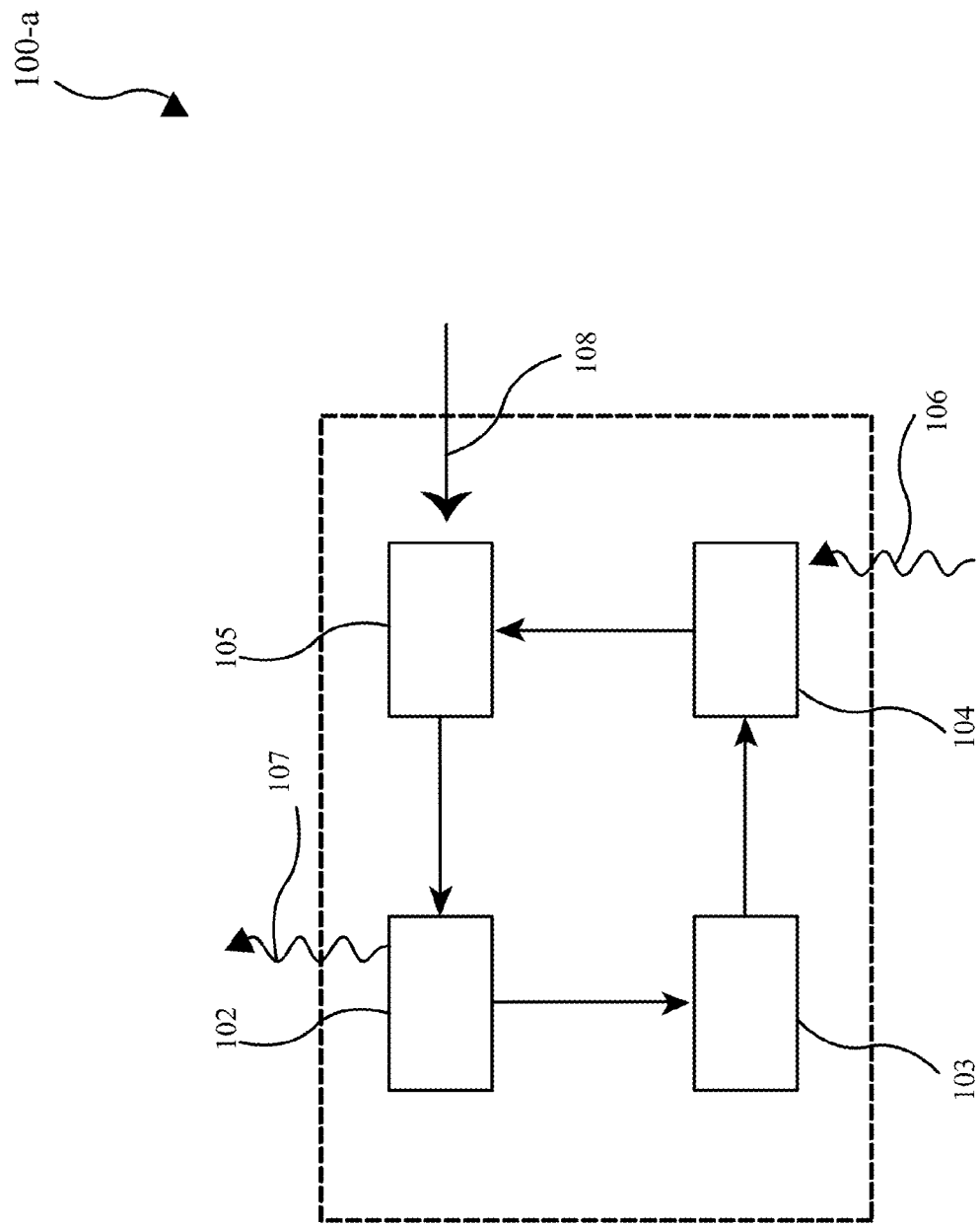
FIG. 1A shows a system for producing a heat pump in accordance with various embodiments.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, and devices may individually or collectively be components of a larger system, wherein other procedures may take precedence over or otherwise modify their application.

Several different embodiments are provided below. Different embodiments may be highly dependent of the application. For example, residential applications may be better suited by some embodiments that sacrifice performance for robustness while industrial applications may be better suited by systems with high performance but larger O&M requirements. Furthermore, the embodiments given here are meant to highlight how different materials and refrigerants may be combined to create a heat pump effect. Therefore, different pieces of process equipment, materials, and/or refrigerants highlighted here can be combined to form different embodiments not specifically highlighted in this document. Additionally, the different embodiments highlighted here may be enhanced by the presence of simple heat exchangers. Some embodiments may utilize additional components that someone skilled in the art will understand that they may or may not be present.

The different methods, systems, and/or devices described herein with respect to different embodiments may be highly dependent of the application of the method and no one embodiment is unanimously superior. For example, large-scale applications may be better suited by some embodiments, while small scale application may be better suited by others. Furthermore, the embodiments given here may be meant to highlight how different pieces of process equipment may fulfill each stage of the method. In some cases, the pieces of process equipment in each stage may only be mildly dependent on the process equipment used in the other stages. Therefore, different pieces of process equipment highlighted in the embodiments below may be combined with other pieces of process equipment from the other embodiments such that a new embodiment could be created not highlighted in this document.

Methods, systems, and devices are provided for moving heat from a cold reservoir to a hot reservoir. In addition, the method, systems, and devices may not utilize vapor-phase refrigerants in some cases. This may be accomplished by using liquid/solid phase refrigerants in a cycle where they may be cyclically precipitated and may be dissolved via a host of process equipment.

The movement of heat from a cold reservoir to a hot reservoir may be accomplished by reversing the natural order of precipitation and solvation. Without a driving force, an ionic material, like a salt, generally may precipitate more readily at lower temperatures and dissolve more readily at hot temperature. The tools and techniques described here may highlight ways of reversing this natural tendency using an energetic driving force.

The methods, systems, and devices described that may include multiple stages. For example, one stage may include a precipitation stage. During this stage, a high enthalpy of fusion material may be precipitated out of a concentrated solution. During this stage, the materials may be in thermal contact with the ambient environment and the temperature difference between the hot material and the relatively cool environment may allow heat to flow freely from the material as it precipitates. Due to the material's high enthalpy of fusion, significant amounts of heat may be released during the precipitation process.

Another stage may include a thermal regeneration stage. For example, once the material has solidified, it may enter the next stage where it may be cooled by a thermal regeneration stage. During this stage, the material may no longer be in thermal contact with the ambient air, but instead may be in thermal contact with cool refrigerant produced after a solvation stage. As the thermal contact continues, the solid refrigerant may be cooled by the refrigerant from the solvation stage, which is warmed.

Another stage may include solvation. During this stage, the chilled solid may be allowed to dissolve into a solvent while in thermal contact with a refrigerated environment. Due to the enthalpy of dilution of the refrigerant, this solvation process may absorb a significant amount of heat from the refrigerant environment. After the refrigerant may have completely dissolved, the resulting solution may be put in thermal contact with the solid refrigerant of the thermal regeneration stage allowing the solution to be warmed.

Another stage may include separation. During this stage, the solvent may be removed from the solution and the mixture may be concentrated to facilitate precipitation during the precipitation stage. This separation can be accomplished thermally, electrically, or mechanically, for example, but may in general be driven by external energy input.

These stages may form a multi-stage cycle that may be dependent on the combined operation of multiple pieces of process equipment. Some embodiments may utilize more or less stages than described herein. At each stage of the cycle, there may be many options capable of producing the same result.

For example, during the separation stage, a multi-effect distillation system may produce the same result as a reverse osmosis or nano-filtration system. Examples of some possible process equipment at the different stage are given below.

During the precipitation stage, an inert liquid thermocline, an inert forced gas priller, an inert natural draft priller, and/or inhibited surface heat exchanger may be used, though other tools and techniques may be utilized in some embodiments.

During the thermal regeneration stage, an indirect and/or direct contact heat exchanger may be used, though other tools and techniques may be utilized in some embodiments. In some cases, the heat transfer surface or area may be directly integrated into the device used in the regeneration stage.

During the solvation stage, heat may be removed from the refrigerated environment through direct thermal contact with the refrigerant via a single heat exchanger and/or or through indirect thermal contact through a secondary heat transfer fluid, though other tools and techniques may be utilized in some embodiments.

During the separation stage, the solvent may be separated by different methods including, but not limited to: membrane distillation, ion exchange, activated carbon absorption, flash separation, distillation, multi-effect distillation, vapor compression distillation, evaporation, and/or liquid-liquid extraction.

The multi-stage process may depend at least on two materials: the refrigerant and the solvent. These materials may have different properties. For example, in the operation of the system, the solvent may generally be a stable liquid capable of dissolving the refrigerant.

In some embodiments, the solvent may take a vapor phase for a very short period of time during the separation stage. In the case of membrane distillation, for example, the solvent may exist in a vapor form for a matter of milliseconds as it moves across the membrane wall which may have a thickness on the order of microns. Possible solvent materials may include, but are not limited to: water, alcohols, ammonia, DMSO, acetone, glycol, polyethylene glycol, aqueous polymer, and/or other polar solvents. Some embodiments may include combinations of solvents, such as water and an additional solvent In some embodiments, the refrigerant may be cyclically dissolved and precipitated from solution. In general, the refrigerant may have a high enthalpy of dilution when it is dissolved in the solvent such that a large amount of energy may be released when it precipitates and a large amount of energy is absorbed when it dissolves. Possible refrigerant materials may include, but are not limited to: $Na_2S_2CO_3$, $Na_2CO_3$, $Na_2CrO_4$, and/or $KNO_3$. The refrigerants may include a hydrate forming salt in some cases.

Other inert materials may exist in the system in order to facilitate precipitation and heat transfer. These materials may include, but are not limited to: hydrocarbon oils and hydraulic fluids, vegetable oils and hydraulic fluids, and/or inert gasses such as air, nitrogen or argon.

A general overview of a system 100-*a* for producing a heat pump in accordance with various embodiments is provided with FIG. 1A. The system 100-*a* generally shows several different stages in accordance with various embodiments. These stages may include the following, though some embodiments may include more or less stages. At stage 102, a first material may be precipitated and may release heat 107. The heat 107 may be released to ambient. The first material may be a refrigerant in some cases. Heat 107 may be referred to as a first heat. At stage 103, the first material may be cooled. The cooling may be performed by thermal regeneration. The thermal regeneration may utilize a cool material, such as a cool brine leaving stage 104, for example. At stage 104, the first material may be dissolved into a second material. The second material may be a solvent in some cases. Heat 106 may be absorbed in the process. The heat 106 may be referred to as a second heat in some cases. The heat 106 may be absorbed from a refrigerated environment in some cases. The heat 106 may be absorbed from other sources such as ambient. At stage 105, the first material and the second material may be separated. The separation may utilize heat 108 in some cases. In some cases, heat 108 may be at a low temperature.

The heat 108 may come from an environment with a controlled temperature, for example. The heat 108 may also come from a variety of different heat collectors, such as a solar tube collector. Some embodiments may utilize other heat collectors, such as a waste heat collector. In general, a low temperature heat may include a heat with a temperature less than 200 degrees Celsius. In some embodiments, a low temperature heat may include a heat with a temperature of 150 degrees Celsius. Some embodiments may include a low temperature heat approximately 80 degrees Celsius, which may include a range between 60 degrees Celsius and 100 degrees Celsius. Some embodiments may utilize other temperatures with respect to heat 108.

One skilled in the art will understand that in each embodiment, a method of circulating the various liquids may be involved. Due to the liquid nature of a circulating fluid, one skilled in the art will understand that various pumps may be involved or that the system may be constructed such that the hydrostatic head may be sufficiently low to allow natural convention based circulation without pumps. As such, no pump components are highlighted in the embodiments, although they may be present in different systems. The embodiments provided can be used to illuminate explicit examples of process equipment that can fulfill the roles for each of the different stages.

Figure 1B:
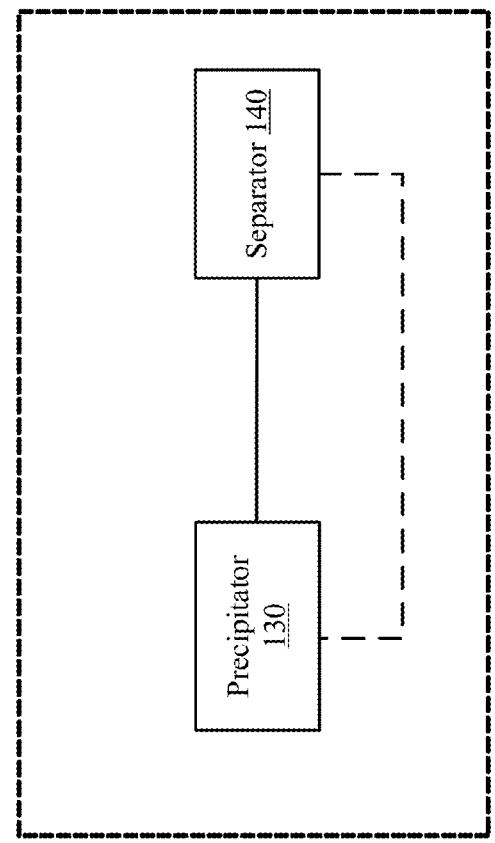
FIG. 1B shows a system for producing a heat pump in accordance with various embodiments.

Another general overview of a system 100-b for producing a heat pump in accordance with various embodiments is provided with FIG. 1B. System 100-b may be an example of aspects of system 100-a of FIG. 1A. System 100-b may include a precipitator 140. System 100-b may also include a separator 140. The specific component(s) shown are intended merely to be illustrative. Some embodiments may include other components, not necessarily shown, that may be utilized. For example, some embodiments of system 100-b may include a heat collector that may be coupled with the separator 140. Some, but not all of these variants, may be noted in the description that follows.

The precipitator 130 may be configured to precipitate a first material. Heat, such as a first heat, may be released from the precipitated first material. The precipitator 130 may be configured to cool the precipitated first material. The precipitator 130 may be configured to dissolve the cooled precipitated first material into a second material to create a dissolved mixture. Heat, such as a second heat, may be absorbed into the mixture. In some embodiments, the precipitator 130 may be configured to perform one or more stages, such as stages 102, 103, and/or 104 of system 100-a of FIG. 1A.

In some embodiments, system 100-b may include a separator 140 configured to separate the first material and the second material from the dissolved mixture. Separator 140 may be coupled with precipitator 130 as shown in FIG. 1B. In some embodiments, the separator 140 may be configured to perform one or more stages, such as stages 105 of system 100-a of FIG. 1A.

In some embodiments of the system 100-b, the first material includes a refrigerant and the second material includes a solvent. In some embodiments, the precipitator 130 includes a heater exchanger configured to cool the precipitated first material. In some embodiments, the separator 140 includes a distiller configured to separate the first material and the second material from the dissolved mixture. In some embodiments, the distiller may include at least a direct contact membrane distiller, an ion exchanger, an activated carbon absorber, a flash separator, a multi-effect distiller, a vapor compression distiller, an evaporator, an air-gap membrane contractor, or a liquid-liquid extractor.

In some embodiments of the system 100-b, the precipitator 130 may include a liquid thermocline configured to precipitate the first material. Heat, such as a first heat, may be released from the precipitated first material. In some embodiments, the precipitator 130 may include a priller configured to precipitate the first material; heat, such as a first heat, may be released from the precipitated first material.

In some embodiments of the system 100-b, the precipitator 130 may include one or more tanks. At least one of the tanks may include one or more faceted surface areas in some cases.

Figure 1C:
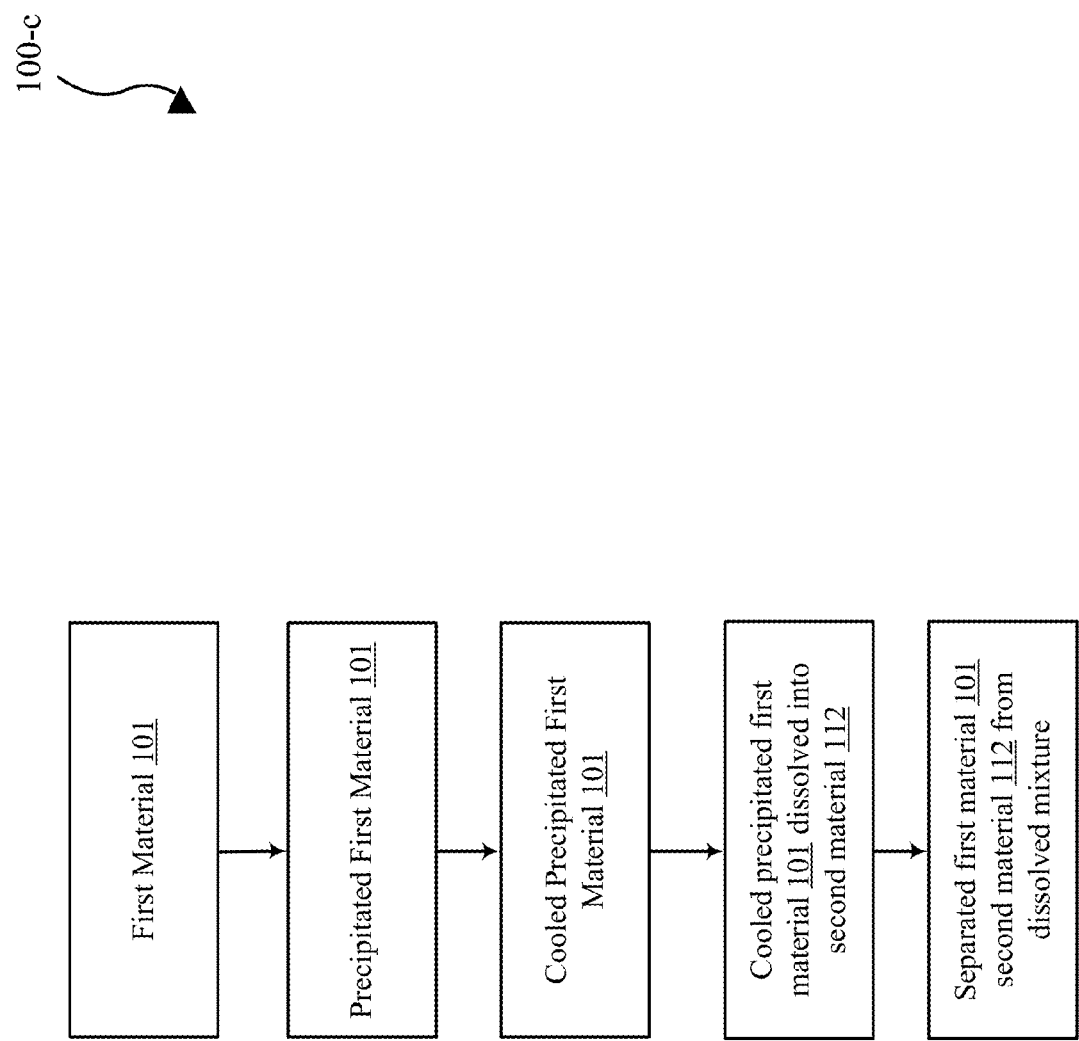
FIG. 1C shows a system for producing a heat pump in accordance with various embodiments.

Another general overview of a system 100-c for producing a heat pump from a material perspective in accordance with various embodiments is provided with FIG. 1C. System 100-c may be an example of aspects of system 100-a of FIG. 1A and/or system 100-b of FIG. 1B. The specific materials shown are intended merely to be illustrative.

In system 100-c, a first material 101 may be provided. The first material 101 may be precipitated. Heat may be released from the precipitated first material 101. This heat may be referred to as a first heat in some embodiments. The precipitated first material 101 may be cooled. The cooled precipitated first material 101 may be dissolved into a second material 112 to create a dissolved mixture. Heat may be absorbed into the mixture. This heat may be referred to as a second heat in some embodiments. The first material 101 and the second material 112 may be separated from the dissolved mixture. Some embodiments of the system may include utilizing at least a portion of the dissolved mixture to perform the cooling of the precipitated first material 101.

In some embodiments of the system 100-c, the first material 101 includes a refrigerant and the second material 112 includes a solvent. The first material 101 may be in thermal contact with an ambient environment when precipitating. The first material 101 may be in thermal contact with a refrigerated environment when at least cooling or dissolving.

In some embodiments of the system 100-c, the precipitation utilizes at least a liquid thermocline, a priller, or a heat exchanger. For example, some embodiments may utilize at least an inert liquid thermocline, an inert forced gas priller, an inert natural draft priller, or an inhibited surface heat exchanger. The cooling may utilize a heat exchanger in some cases. For example, the cooling may utilize at least an indirect contact heat exchanger or a direct contact heat exchanger.

In some embodiments of the system 100-c, heat, such as the second heat, is absorbed into the dissolved mixture through removing heat from a refrigerated environment. This may be through at least direct thermal contact with a refrigerant or indirect thermal contract with a secondary heat transfer fluid. The separation may utilize a variety of different techniques including, but limited to, at least a membrane distillation, an ion exchange, an activated carbon absorption, a flash separation, a distillation, a multi-effect distillation, a vapor compression distillation, an evaporation, air-gap membrane extraction, or a liquid-liquid extraction.

In some embodiments of the system 100-c, the solvent includes at least water, alcohol, glycol, ammonia, DMSO, acetone, PEG, aqueous polymer, or polar solvent. In some cases, the solvent may include a combination of solvents, such as water and at least one other solvent. The refrigerant may include a hydrate forming salt. In some embodiments, the refrigerant includes at least $Na_2S_2CO_3$, $Na_2CO_3$, $NA_2CrO_4$, or $KNO_3$.

Figure 2:
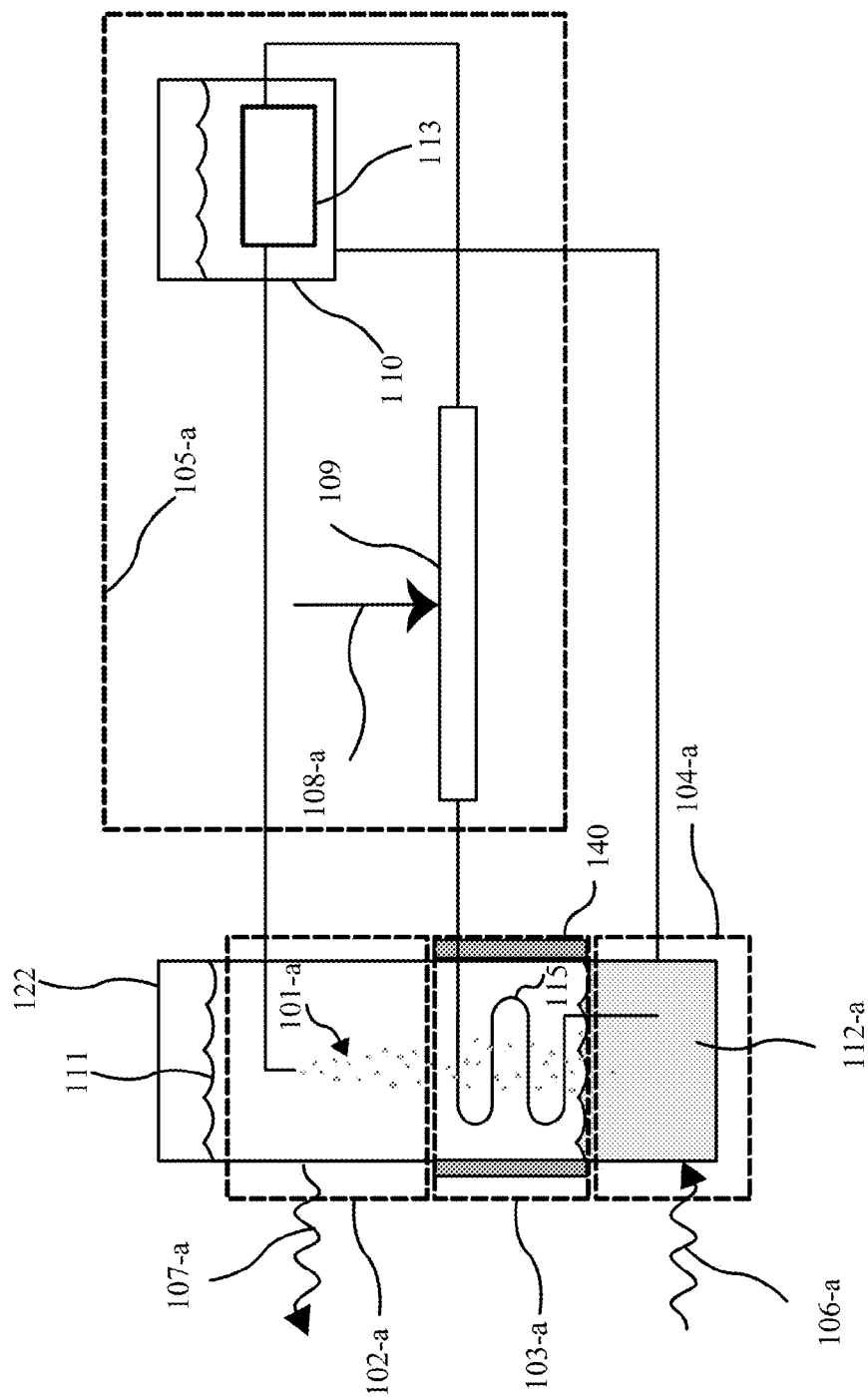
FIG. 2 shows a system for producing a heat pump in accordance with various embodiments.

Turning to FIG. 2, a system 200 for producing a heat pump in accordance to various embodiments is shown. System 200 may be an example of one or more aspects of system 100-a of FIG. 1A, system 100-b of FIG. 1B, and/or system 100-c of FIG. 1C. System 200 may utilize a first material 101-a as refrigerant, which may include a hydrate forming salt, for example. A second material 112-a may include solvent, which may include water in some cases. For example, the second material 112-a may include a dilute brine, which may include water. System 200 may utilize an energy and/or heat source including, but not limited to, a solar energy. System 200 may utilize a variety of separation means including, but not limited to, a direct contact membrane distillation for separation. Variations of system 200 may utilize different forms of the first material, the second material, the energy source, and/or the separation means. Variations of system 200 may provide a variety of different means for precipitating the first material, cooling the precipitated first material, and/or dissolving the cooled precipitated first material into the second material.

At stage 102-*a* of system 200, a concentrated aqueous salt solution 101-*a* may be ejected into an oil thermocline 111 where it may fall through the temperature gradient of the oil due to its higher density. The oil thermocline 111 may be contained in one or more containers 122. The inert oil may generally not interact with the concentrated salt solution 101-*a* because of the extremely low cross-solubility of the two materials. As the salt solution 101-*a* falls through the oil thermocline 111, it may be cooled and may begin to precipitate, releasing heat 107-*a* to ambient via the oil intermediary. Because the salt 101-*a* may form a hydrate, its crystal structure may contain the water solvent from the solution and a majority of the solution may be capable of solidifying.

At stage 103-*a* of system 200, once the solution 101-*a* may be solidified and released its heat 107-*a* of precipitation to ambient, the falling salt may enter a thermal regeneration portion of the oil thermocline 111. In this area, the thermocline 111 may be cooled below ambient by the cool dilute brine leaving the solvation stage via a heat exchanger coil 115. In this area, the salt may be further cooled close to the temperature of the cooling brine. Some embodiments may include one or more insulation layers 140 coupled with container 122, which may facilitate stage 103-*a*.

At stage 104-*a* of system 200, during this stage the falling solid hydrate salt may fall into a dense, but more dilute brine 112-*a* that the oil thermocline 111 may be floating on-top of. This brine 112-*a* may be kept dilute by the constant addition of pure water from the water tank 110. Because this brine 112-*a* may be dilute, the hydrate 112-*a* may readily dissolve absorbing heat 106-*a* from the refrigerated environment. Dilute brine 112-*a* may be constantly extracted from this area to be sent to the heat exchanger coil 115 in the regeneration stage.

At stage 105-*a* of system 200, after cooling the thermal regeneration area of the oil thermocline 111, the brine may flow to a solar collector 109 where it may absorb thermal energy 108-*a*. This may heat the brine to the temperature that may facilitate separation via a direct contact membrane distillation module 113. This module 113 may utilize a temperature different between the pure water permeate and the hot incoming brine to drive water vapor out of the brine and into the pure water. The pure water may be stored until the dilute brine section may utilize it in stage 104-*a* of system 200. The concentrated hot brine may leave the membrane module 113 and may flow back to be re-injected into the oil thermocline 111.

Figure 3:
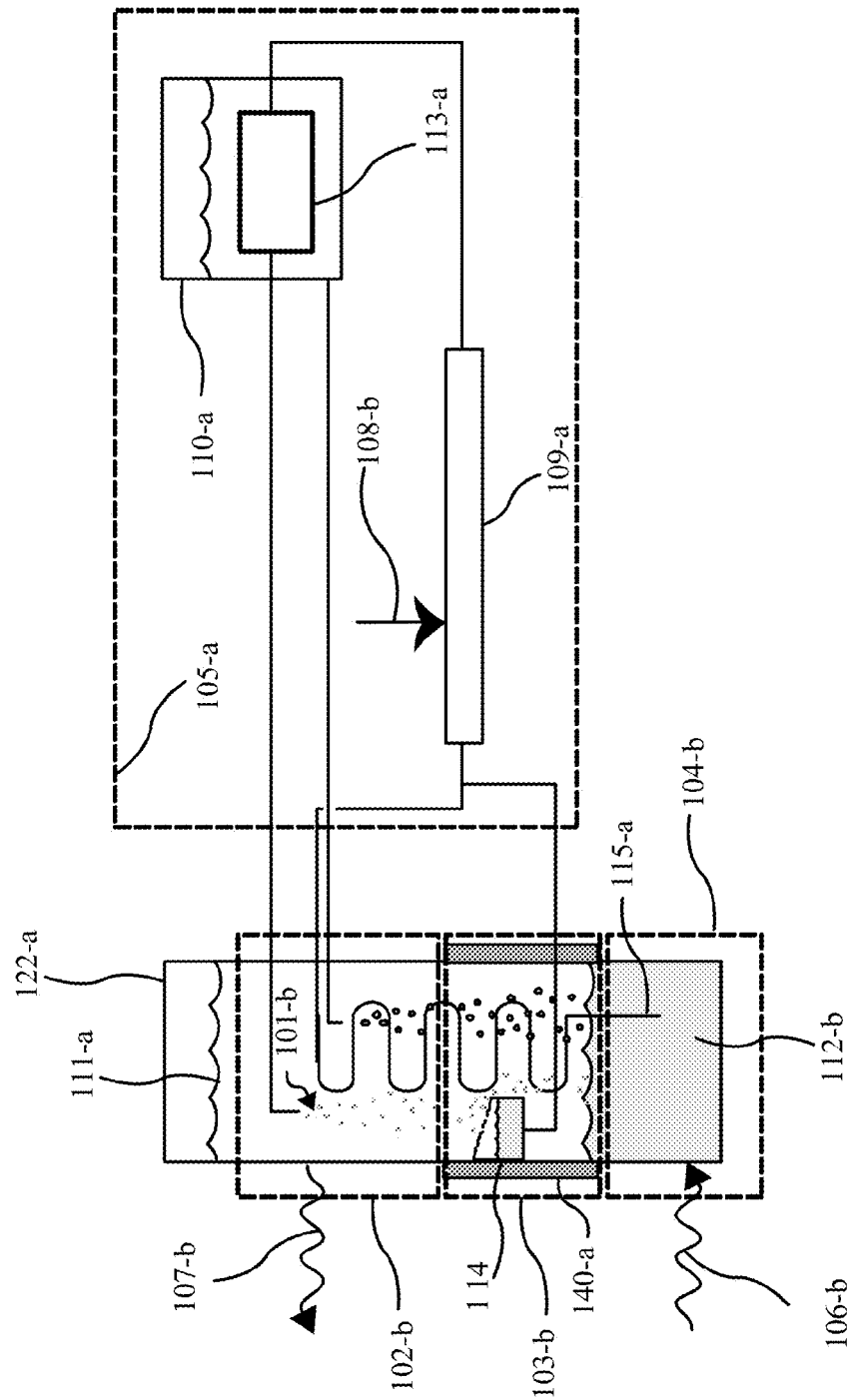
FIG. 3 shows a system for producing a heat pump in accordance with various embodiments.

Turning to FIG. 3, a system 300 for producing a heat pump in accordance to various embodiments is shown. System 300 may be an example of one or more aspects of system 100-*a* of FIG. 1A, system 100-*b* of FIG. 1B, and/or system 100-*c* of FIG. 1C. System 300 may utilize a first material 101-*b* that may include a non-hydrate forming salt. For example, the first material 101-*a* may include a concentrated aqueous salt solution. A second material 112-*b* may include a solvent, which may include water. For example, the second material 112-*b* may include a dilute brine, which may include water. System 300 may utilize an energy and/or heat source including, but not limited to, a solar energy. System 300 may utilize a separation means including, but not limited to, direct contact membrane distillation for separation. Variations of system 300 may utilize different forms of the first material, the second material, the energy source, and/or the separation means. Variations of system 300 may provide a variety of different means for precipitating the first material, cooling the precipitated first material, and/or dissolving the cooled precipitated first material into the second material.

At stage 102-*b* of system 300, a concentrated aqueous salt solution 101-*b* may be ejected into an oil thermocline 111-*a* where it may fall through the temperature gradient of the oil due to its higher density. The oil thermocline 111-*a* may be contained in one or more containers 122-*a*. The inert oil generally may not interact with the concentrated salt solution 101-*b* because of the extremely low cross-solubility of the two materials. As the salt solution 101-*b* falls through the oil thermocline 111-*a*, it may be cooled and may begin to precipitate releasing heat 107-*b* to ambient via the oil intermediary. Because the salt 101-*b* may be a non-hydrate forming, the water may remain liquid with a portion of the refrigerant remaining in aqueous solution. A heat exchanger coil 115-*a* may thermally stabilize the oil thermocline 111-*a* with cool brine from stage 104-*b* of system 300 and may recover some of the heat of precipitation.

At stage 103-*b* of system 300, once the salt 101-*b* in the solution may have precipitated and may have released its heat of precipitation to ambient, the solid salt and dilute brine may be separated via a liquid-porous gravity driven separator 114. This separator 114 may collect the liquid from the falling mixture and may allow it to short circuit stage 104-*b* of system 300. The remaining falling solid salt may enter the thermal regeneration portion of the oil thermocline 111-*a*. In this area, the thermocline 111-*a* may be cooled below ambient by the cool dilute brine leaving the solvation stage via a heat exchanger coil 115-*a*, which may extend through a substantial portion of the thermocline 111-*a*. In this area, the salt may be further cooled close to the temperature of the cooling brine. Some embodiments may include one or more insulation layers 140-*a* coupled with container 122-*a*, which may facilitate stage 103-*b*.

At stage 104-*b* of system 300, during this stage, the falling solid salt may fall into a dense, but more dilute brine 112-*b* that the oil thermocline 111-*a* may be floating on top of. This brine may be kept dilute by the constant addition of pure water from the water tank 110-*a*. Because this brine may be dilute, the salt may readily dissolve, absorbing heat 106-*b* from the refrigerated environment. Dilute brine may be constantly extracted from this area to be sent to the heat exchanger coil 115-*a* in the regeneration stage.

At stage 105-*a* of system 300, after cooling the thermal regeneration area of the oil thermocline, the brine may be combined with brine from the liquid solid separator and both flow through a solar collector 109-*a* where they may absorb thermal energy 108-*a*. This may heat the brine to the temperature that may be required for separation via a direct contact membrane distillation module 113-*a*. This module 113-*a* may utilize a temperature different between the pure water permeate and the hot incoming brine to drive water vapor out of the brine and into the pure water. The pure water may be stored until the dilute brine section requires it in stage 105-*a* of system 300. The concentrated hot brine may leave the membrane module 113-*a* and may flow back to be re-injected into the oil thermocline 111-*a*.

Figure 4:
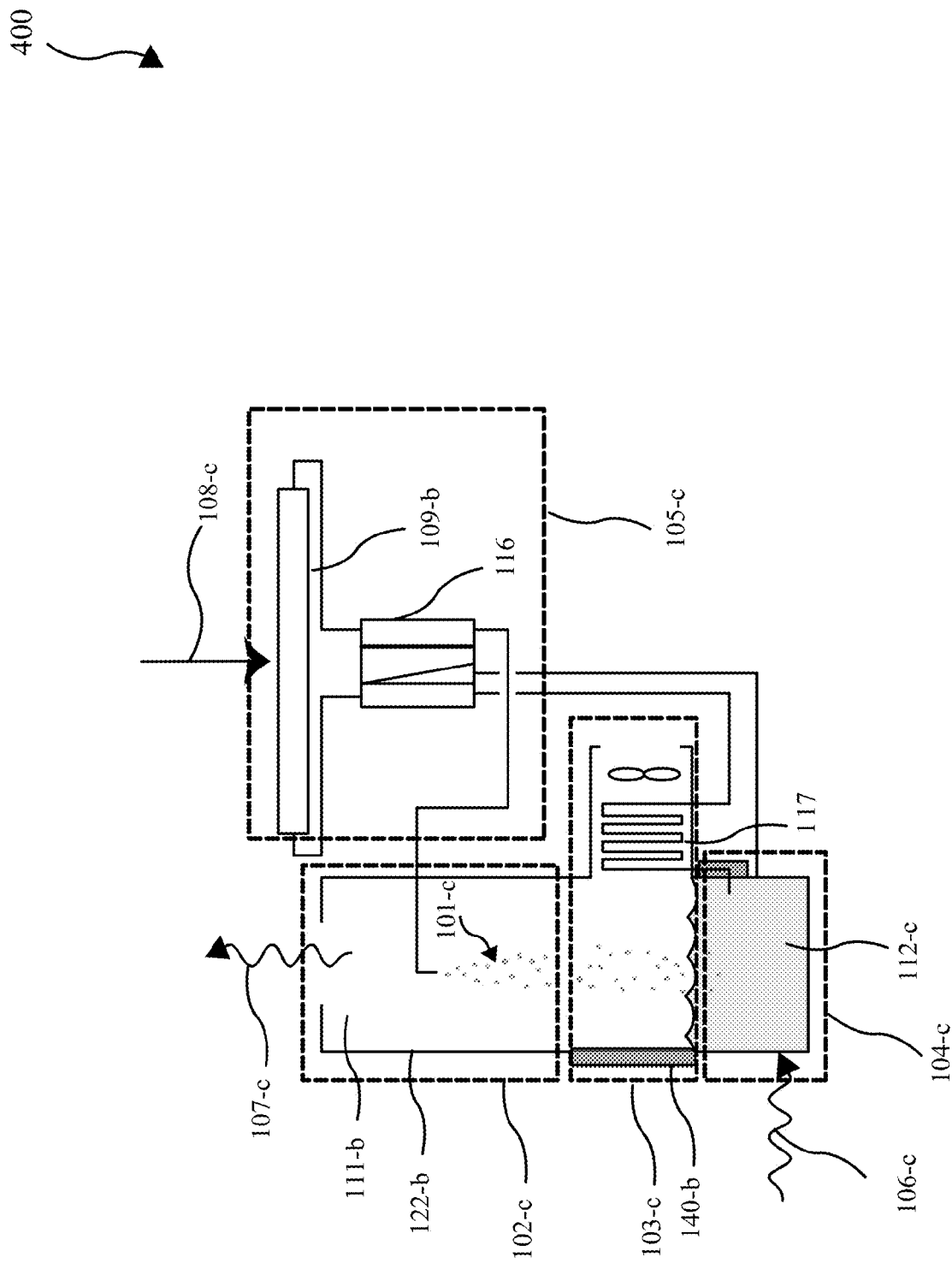
FIG. 4 shows a system for producing a heat pump in accordance with various embodiments.

Turning to FIG. 4, a system 400 for producing a heat pump in accordance to various embodiments is shown. System 400 may be an example of one or more aspects of system 100-*a* of FIG. 1A, system 100-*b* of FIG. 1B, and/or system 100-*c* of FIG. 1C. System 400 may utilize a first material 101-*c*. In some embodiments, the first material 101-*c* may include a refrigerant. For example, the first material 101-*a* may include a hydrate forming salt and/or other refrigerants. A second material 112-*c* may be utilized in system 400. The second material 112-*c* may include a solvent, which may include water and/or other solvents. System 400 may utilize an energy and/or heat source, which may include, but is not limited to, solar energy. System 400 may utilize a separation means including, but not limited to, an air-gap membrane distillation for separation. Variations of system 400 may utilize different forms of the first material, the second material, the energy source, and/or the separation means. Variations of system 400 may provide a variety of different means for precipitating the first material, cooling the precipitated first material, and/or dissolving the cooled precipitated first material into the second material.

At stage 102-*c* of system 400, the concentrated aqueous salt solution 101-*c* may be ejected into a forced air priller 111-*b*, where it may fall counter currently through a moving air flow. The priller 111-*b* may be part of one or more containers 122-*b*. As the salt solution 101-*c* falls through the air, it may be cooled and may begin to precipitate releasing heat that may leave the system 400 to ambient in the form of exhaust air 107-*c*. Because the salt 101-*c* may form a hydrate, its crystal structure may contain the water solvent from the solution and a majority of the solution may be capable of solidifying.

At stage 103-*c* of system 400, once the solution 101-*c* may have solidified and may have released its heat of precipitation to ambient, the falling salt 101-*c* may enter the thermal regeneration portion of the air priller 111-*b*. As the air enters the air priller 111-*b*, it may be cooled via a brine-air heat exchanger 117. This heat exchanger 117 may contain brine extracted from 104-*c* of system 400. The air may be cooled to a temperature near that of the cold brine in stage 104-*c* of system 400. It then may be warmed by cooling the air being drawn into the air priller 111-*b*. Some embodiments may include one or more insulation layers 140-*b* coupled with container 122-*b*, which may facilitate stage 103-*c*.

At stage 104-*c* of system 400, the falling solid hydrate salt 101-*c* may fall into a dense, but more dilute brine 112-*c* at the bottom of the priller 111-*b*. This brine may be kept dilute by the constant addition of pure water from an air-gap membrane module 116. Because this brine is dilute, the hydrate may readily dissolve, absorbing heat 106-*c* from the refrigerated environment. Dilute brine may be constantly extracted from this area to be sent to the heat exchanger 117 in a regeneration stage.

At stage 105-*c* of system 400, after cooling the thermal regeneration area of the forced air priller 111-*b*, the brine may flow into the heat regeneration portion of the air-gap membrane contactor 116 where it may help to drive the separation of the refrigerant and solvent. This may warm the brine before entering the solar collector 109-*b* where it may absorb thermal energy 108-*c*. This may heat the brine to the temperature that may be involved for separation via the air-gap membrane contractor 116 in some cases. This may utilize a temperature different between the pure water permeate and the hot incoming brine to drive water vapor out of the brine and into the pure water. The pure water may be directly injected into the dilute brine section in stage 104-*c* of system 400. The concentrated hot brine may leave the membrane module 116 and may flow back to be re-injected into the air priller 111-*b*.

Figure 5:
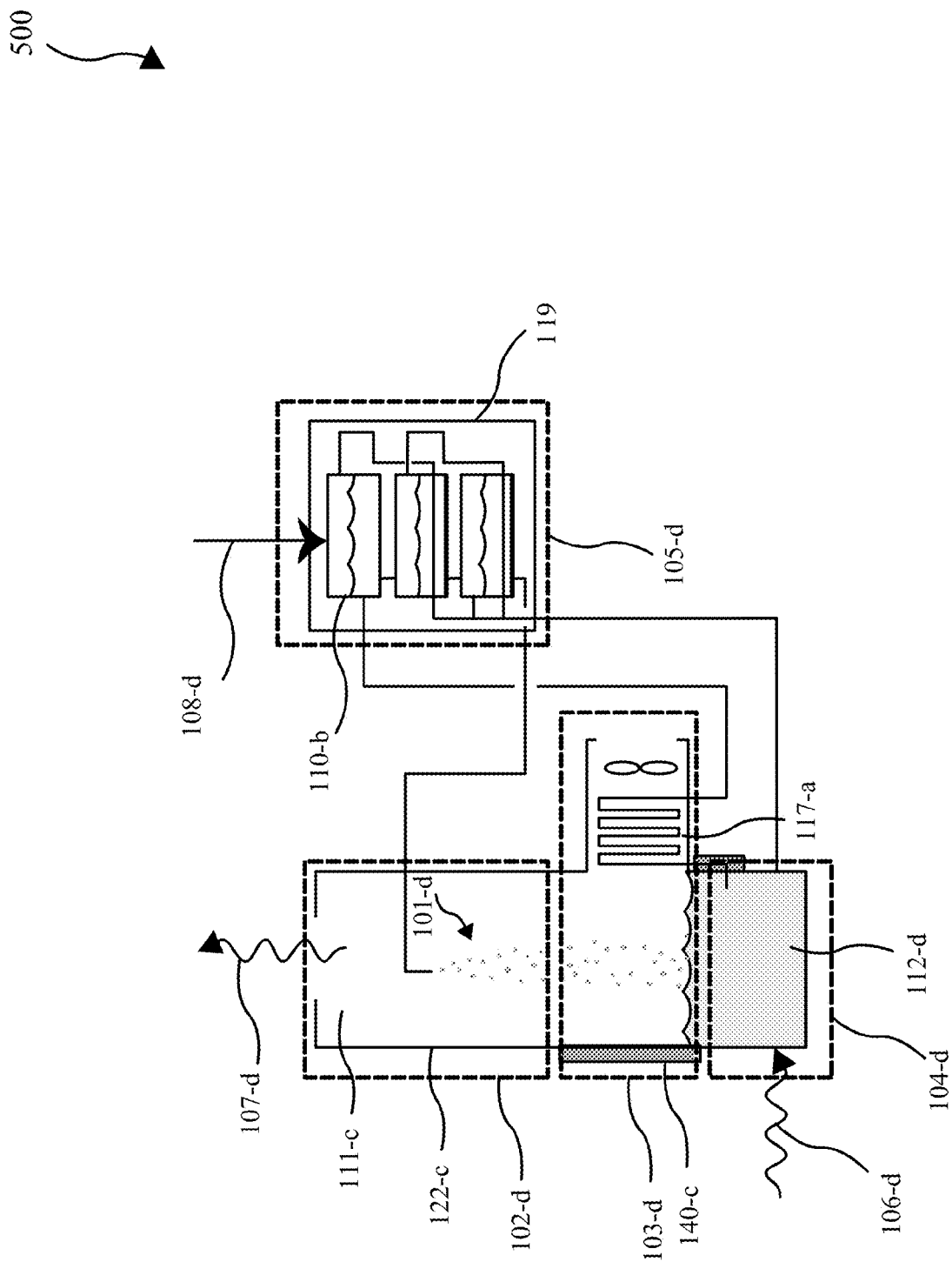
FIG. 5 shows a system for producing a heat pump in accordance with various embodiments.

Turning to FIG. 5, a system 500 for producing a heat pump in accordance to various embodiments is shown. System 500 may be an example of one or more aspects of system 100-*a* of FIG. 1A, system 100-*b* of FIG. 1B, and/or system 100-*c* of FIG. 1C. System 500 may utilize a first material 101-*d*. The first material may include a refrigerant, which may include a hydrate forming salt and/or other refrigerants. A second material 112-*d* may be utilized in system 500. The second material 112-*d* may include a solvent, which may include water and/or other solvents. System 500 may utilize an energy and/or heat source, which may include, but is not limited to, waste heat. System 500 may utilize a separation means, including, not limited to, a multi-effect distillation for separation. Variations of system 500 may utilize different forms of the first material, the second material, the energy source, and/or the separation means. Variations of system 500 may provide a variety of different means for precipitating the first material, cooling the precipitated first material, and/or dissolving the cooled precipitated first material into the second material.

At stage 102-*d* of system 500, a concentrated aqueous salt solution 101-*d* may be ejected into a forced air priller 111-*c*, where it may fall counter currently through a moving air flow. The priller 111-*c* may be part of one or more containers 122-*c*. As the salt solution 101-*d* falls through the air, it may be cooled and may begin to precipitate releasing heat that may leave the system to ambient in the form of exhaust air 107-*d*. Because the salt may form a hydrate, its crystal structure may contain the water solvent from the solution and a majority of the solution may be capable of solidifying.

At stage 103-*d* of system 500, as the solution 101-*d* may be solidified and may release its heat of precipitation to ambient, the falling salt may enter the thermal regeneration portion of the air priller 111-*c*. As the air enters the priller 111-*d*, it may be cooled via a brine-air heat exchanger 117-*a*. This heat exchanger 117-*a* may contain brine extracted from stage 104-*d*. The air may be cooled to a temperature near that of the cold brine in stage 104-*d*. It then may be warmed by cooling the air being drawn into the priller 111-*c*.

At stage 104-*d* of system 400, the falling solid hydrate salt may fall into a dense, but more dilute brine 112-*d* at the bottom of the priller tower 111-*c*. This brine may be kept dilute by the constant addition of pure water from the water tank 110-*b*. Because this brine may be dilute, the hydrate may readily dissolve, absorbing heat 106-*d* from the refrigerated environment. Dilute brine may be constantly extracted from this area to be sent to the heat exchanger 117-*a* in the regeneration stage.

At stage 105-*d* of system 500, after cooling the thermal regeneration area of the forced air priller 111-*c*, the brine may flow into the first stage of a multi-effect distillation system 119. Pressure in this stage may be lowered such that the brine boils when put in thermal contact with low temperature waste heat 108-*d*. The water vapor that may be created in this stage may be used to drive the subsequent stages where the pressure may be systematically reduced to allow for continued boiling. Through one or more stages, the brine may be concentrated and pure water may be removed. The pure water may be injected back into the dilute brine portion of the system and the concentrated hot brine may flow back to be re-injected into the air priller 111-*c*.

Figure 6:
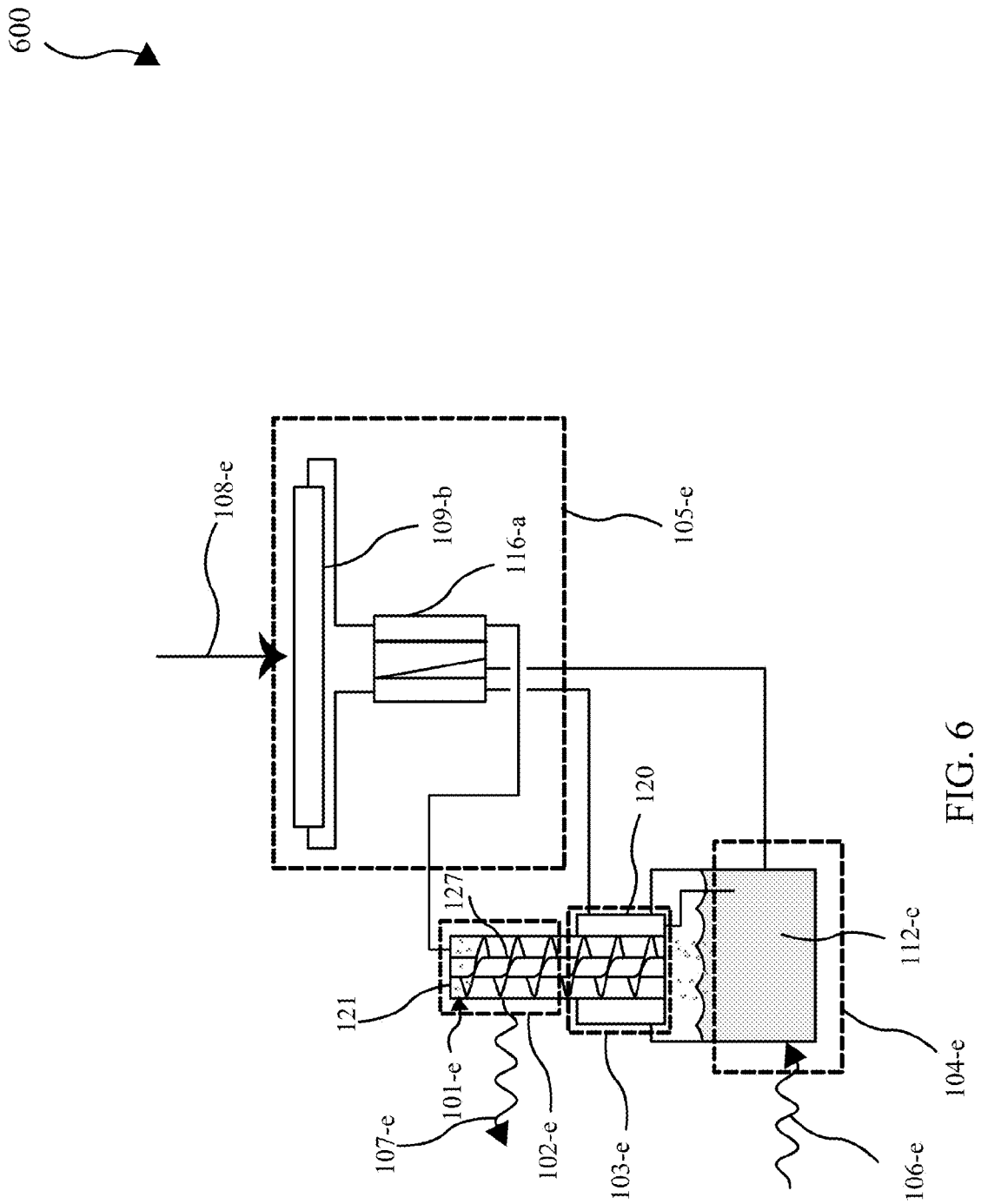
FIG. 6 shows a system for producing a heat pump in accordance with various embodiments.

Turning to FIG. 6, a system 600 for producing a heat pump in accordance to various embodiments is shown. System 600 may be an example of one or more aspects of system 100-*a* of FIG. 1A, system 100-*b* of FIG. 1B, and/or system 100-*c* of FIG. 1C. System 600 may utilize a first material 101-*e*. The first material 101-*e* may include refrigerant, which may include a hydrate forming salt and/or other refrigerants. A second material 112-*e* may be utilized in system 600. The second material 112-*e* may include a solvent, which may include water and/or other solvents. The system 600 may utilize an energy and/or heat source, which may include, but is not limited to, solar energy. System 600 may utilize a separation means including, but not limited to, an air-gap membrane distillation for separation. Variations of system 600 may provide a variety of different means for precipitating the first material, cooling the precipitated first material, and/or dissolving the cooled precipitated first material into the second material.

At stage 102-*e* of system 600, a concentrated aqueous salt solution 101-*e* may flow into a scrapped surface heat exchanger 121 where it may be initially cooled by ambient. The hydrate may be formed on the heat exchanger surface, releasing heat 107-*e* to ambient. As this material precipitates, a helical augur 127 may continually remove it. This may create a slurry of hydrate that may descend the length of the heat exchanger 121. Because the salt may be hydrate forming, it may hold the water of the solution in its crystal structure when it forms, which may allow a significant amount of the solution to solidify.

At stage 103-*e* of system 600, once the majority of the solution may have solidified and may have released its heat of precipitation to ambient, the salt may enter the thermal regeneration portion of the scrapped surface heat exchanger 121. This portion of the heat exchanger 121 may be cooled by a liquid heat exchanger 120 with cool brine may be extracted from stage 104-*e* of system 600. This may allow the slurry material inside the scrapped surface heat exchanger 121 to be cooled to near-stage 104-*e* temperatures.

At stage 104-*e* of system 600, the solid hydrate salt may fall into a dense, but more dilute brine 112-*e* below the outlet of the scrapped surface heat exchanger. This brine may be kept dilute by the constant addition of pure water from stage 105-*e*. Because this brine may be dilute, the hydrate may readily dissolve absorbing heat 106-*e* from the refrigerated environment. Dilute brine may be constantly extracted from this area to be sent to the heat exchanger 120 in a regeneration stage.

At stage 105-*e* of system 600, after cooling the thermal regeneration area of the scrapped surface heat exchanger 121, the brine may flow into the heat regeneration portion of an air-gap membrane contactor 116-*a* where it may help to drive the separation of the refrigerant and solvent. This may warm the brine before entering the solar collector 109-*b* where it may absorb thermal energy 108-*e*. This may heat the brine to the temperature that may be required for separation via the air-gap membrane contactor 116-*a*. This module may utilize a temperature different between the pure water permeate and the hot incoming brine to drive water vapor out of the brine and into the pure water. The pure water may be directly injected into the dilute brine section in stage 104-*e* of system 600. The concentrated hot brine may leave the membrane module 116-*a* and may flow back to be re-injected into the heat exchanger 121.

Figure 7A:
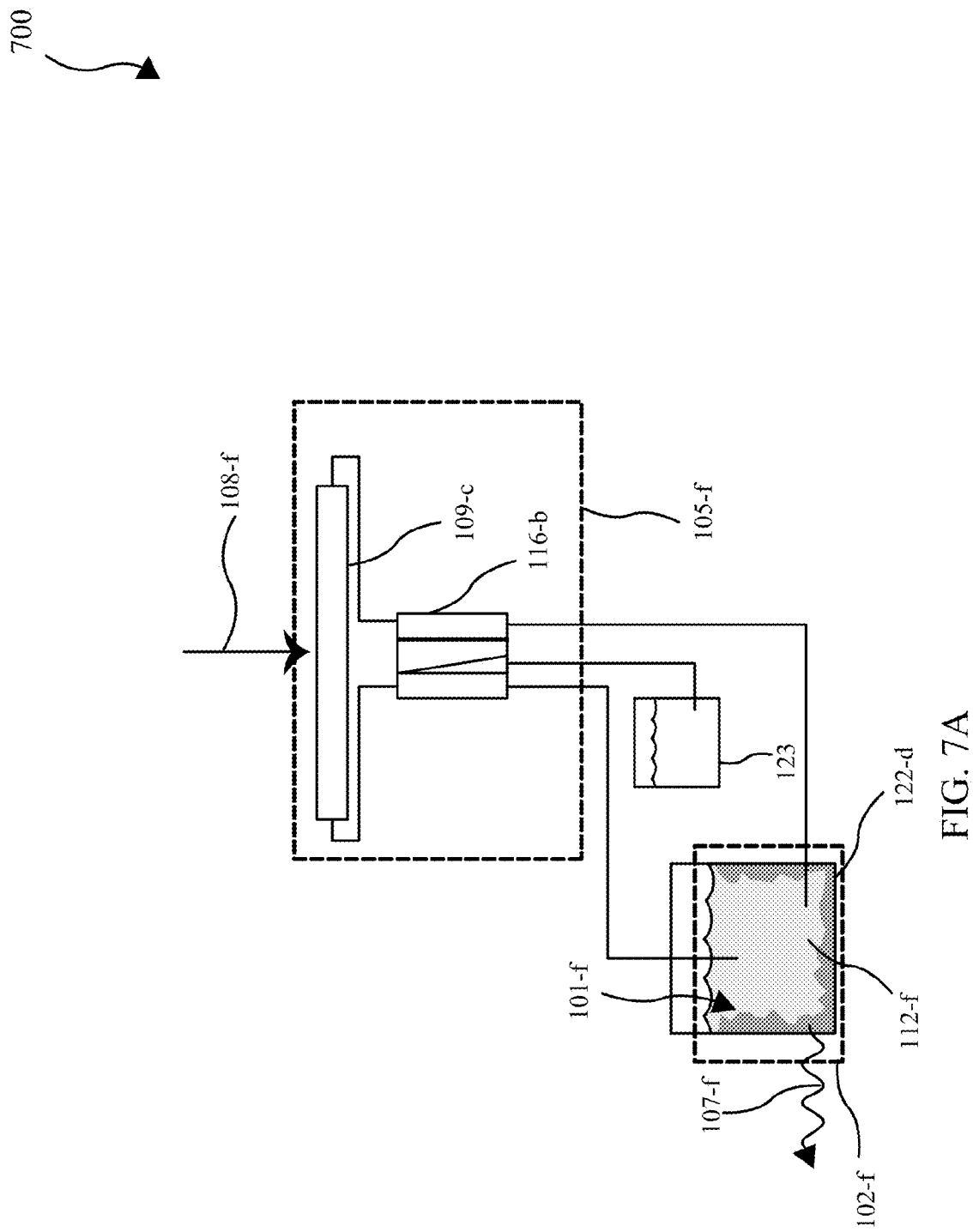

Turning to FIG. 7A and FIG. 7B, a system 700 for producing a heat pump in accordance to various embodiments is shown. System 700 may be an example of one or more aspects of system 100-*a* of FIG. 1A, system 100-*b* of FIG. 1B, and/or system 100-*c* of FIG. 1C. System 700 may utilize a first material 101-*f*. The first material 101-*f* may include refrigerant, which may include a hydrate forming salt and/or other refrigerants. A second material 112-*f* may be utilized in system 700. The second material 112-*f* may include a solvent, which may include water and/or other solvents. The system 700 may utilize an energy and/or heat source, which may include, but is not limited to, solar energy. System 700 may utilize a separation means including, but not limited to, an air-gap membrane distillation for separation. Variations of system 700 may provide a variety of different means for precipitating the first material, cooling the precipitated first material, and/or dissolving the cooled precipitated first material into the second material.

The system 700 may also be operated using a batch approach where salt is precipitated during one operational mode and then solvated during another providing, respectively, heat rejection and heat absorption.

At stage 105-*f*, as shown in FIG. 7A, after dumping heat 107-*f* to ambient and losing excess salt above the saturation point due to precipitation, brine flows 112-*f* may flow into the heat regeneration portion of an air-gap membrane contactor 116-*b* where it may help to drive the separation of the refrigerant and solvent. This may warm the brine before entering the solar collector 109-*c* where it may absorb thermal energy 108-*f*. This may heat the brine to the temperature involved with separation via an air gap membrane module 116-*b*. This module 116-*b* may utilize a temperature different between the pure water permeate and the hot incoming brine to drive water vapor out of the brine and into the pure water. The hot concentrated brine flow out of the membrane module 116-*b* and into the tank 122-*d* where more precipitation may occur. The water may be stored in a separate tank 123 where it may be used again during stage 103-*f* and/or 104-*f* of FIG. 7B.

At stage 102-*f* as shown in FIG. 7A, the concentrated aqueous salt solution 101-*f* flows into a tank 122-*d*, which may have a large surface area. This tank 122-*d* may have a faceted surface to increase its external surface area. As heat 107-*f* may be rejected to ambient, hydrate salt may precipitate on the tank surface. Because the salt may be hydrate forming, it may hold the water of the solution in its crystal structure when it may form allowing a significant amount of the solution to solidify.

At stage 103-*f*, concentrated cold brine may flow up from the bottom of the tank 122-*d*, where solvation may be taking place in stage 104-*f*. This cold brine may be saturated thus it may not hold more salt and precipitation may not occur. However, it may have considerable sensible chill and may be able to cool the solid salt in stage 103-*f* before the level of the dilute brine may reach the top of the tank 122-*d* and solvation may occur. Thus, the salt may be pre-cooled to near stage 105-*f* levels before solvation may occur.

At stage 104-*f*, water may enter the tank 122-*d* with large external surface area that may be faceted to have increased surface area. The water may be drained from a tank 123 via a pump or by gravity, for example. Upon entering the tank 122-*d* where solid salt may be present, it may decrease the concentration of the brine, which may promote solvation of the salt. This process may lead to absorption of heat 106-*f* from the refrigerated environment and may produce a cold saturated brine that may flow to stage 103-*f*.

Figure 8A:
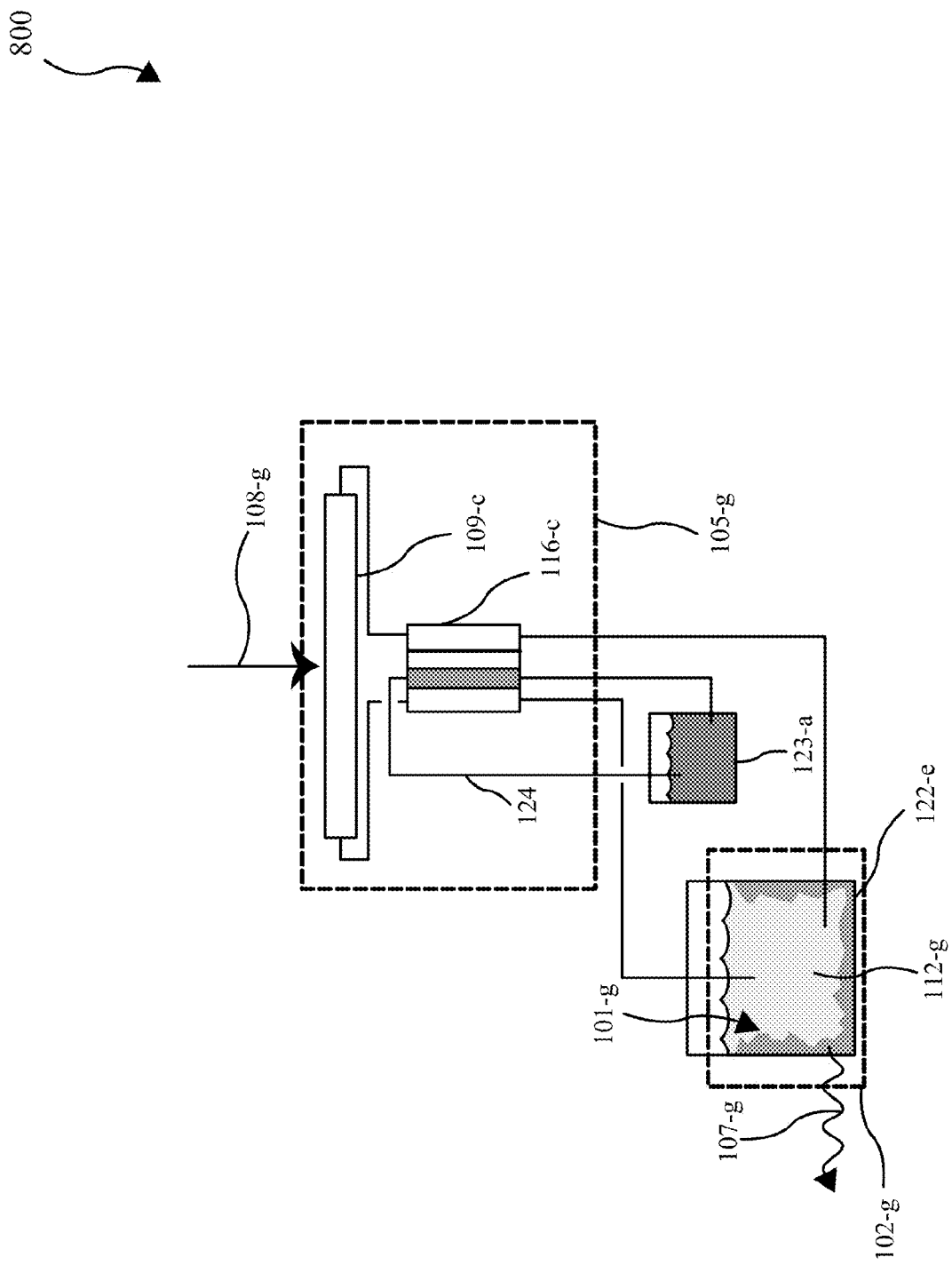

Turning to FIG. 8A and FIG. 8B, a system 800 for producing a heat pump in accordance to various embodiments is shown. System 800 may be an example of one or more aspects of system 100-*a* of FIG. 1A, system 100-*b* of FIG. 1B, and/or system 100-*c* of FIG. 1C. System 800 may utilize a first material 101-*g*. The first material 101-*g* may include refrigerant, which may include a hydrate forming salt and/or other refrigerants. A second material 112-*g* may be utilized in system 800. The second material 112-*e* may include a solvent, which may include water and polyethylene glycol (PEG), and in some cases other solvents. The system 800 may utilize an energy and/or source, which may include, but is not limited to, solar energy. System 800 may utilize a separation means including, but not limited to, an air-gap membrane distillation for separation. Variations of system 800 may provide a variety of different means for precipitating the first material, cooling the precipitated first material, and/or dissolving the cooled precipitated first material into the second material.

It is possible to design variations of system 800 that may use mixed solvents to promote separation and increase heat absorption. In this example, a solvent mixture of water and PEG may be used.

At stage 105-*g* of FIG. 8A, after heat 107-*g* may be dumped to ambient and may lose excess salt above the saturation point due to precipitation, brine may flow into the heat regeneration portion of an air-gap membrane contactor 116-*b* where it may help to drive the separation of the refrigerant 101-*g* and solvent 112-*g*. This may warm the brine before entering the solar collector 109-*c* where it may absorb thermal energy 108-*g*. This may heat the brine to the temperature involved with separation via an air gap membrane module 116-*c*. This module 116-*c* may utilize a temperature different between the pure water permeate and the hot incoming brine to drive water vapor out of the brine and into the water PEG mixture. The presence of the PEG may increase the rate and efficiency of separation in this device due to its effect on the vapor pressure. The hot concentrated brine may flow out of the membrane module and into the tank 122-*e* where more precipitation may occur. The water PEG mixture may be stored in a separate tank 123-*a*, which may be used again during stage 103-*g* of FIG. 8B and/or stage 104-*g* of FIG. 8B. It may be re-circulated through the membrane 116-*c* by a circulation loop 124.

At stage 102-*g* of FIG. 8A, the concentrated aqueous salt 101-*g* solution flows into the tank 122-*e*, which may have a large surface area. This tank 122-*e* may have a faceted surface to increase its external surface area. As heat 107-*g* may be rejected to ambient, hydrate salt may precipitate on the tank surface. Because the salt may be hydrate forming, it may hold the water of the solution in its crystal structure when it may form, which may allow a significant amount of the solution to solidify. The tank with its faceted surface may act as a heat exchanger.

At stage 103-*g*, concentrated cold brine and separated PEG may flow up from the bottom of the tank 122-*e*, where solvation and water PEG separation may be taking place in stage 104-*g*. This cold brine and PEG may be saturated thus they may not hold more salt and precipitation does not occur. However, they may have considerable sensible chill and may be able to cool the solid salt in stage 103-*g* before the level of the dilute brine may reach the top of the tank and solvation occurs. Thus, the salt may be pre-cooled to near stage 104-*g* levels before solvation may occur.

At stage 104-*g*, water PEG mixture may enter tank 122-*e* with large external surface area that may be faceted to have increased surface area. The mixture may be drained from tank 123-*a* via a pump or by gravity. Upon entering the tank 122-*e* where solid salt may be present, it may decrease the concentration of the brine promoting solvation of the salt. As salt may be solvated, the mixture of PEG and water may become entropically less favorable and a biphasic system may be formed. The top phase 125 may have a high concentration of PEG while the bottom phase 126 may have a high concentration of dissolved salt. By selecting a solvent mixture with an exothermic enthalpy of mixing, the separation of water and PEG may enhance the heat 106-*g* absorption from ambient. The overall process of salt solvation and water PEG separation may lead to a refrigeration effect and may generate the cold brine that may be used in stage 103-*g*.

The above systems provide different examples in accordance with various embodiments. While specific examples may illustrate the use of specific materials and/or components, numerous variations may be possible. For example, for system 200 of FIG. 2, system 300 of FIG. 3, system 400 of FIG. 4, system 500 of system 5, system 600 of FIG. 6, system 700 of FIG. 7A and/or FIG. 7B, and/or system 800 of FIG. 8A and/or FIG. 8B, the first material 101 may include a variety of refrigerants or combination of refrigerants including, but not limited to, hydrate forming salt in general; some examples of possible first materials include, but are not limited to, Na2S2CO3, Na2CO3, NA2Cr04, or KNO3. For these systems, the second material 112 may include a variety of solvents or combination of solvents including, but not limited to, water, alcohol, glycol, ammonia, DMSO, acetone, polyethylene glycol, aqueous polymer, or polar solvent.

One or more aspects of the above described systems, such as system 200 of FIG. 2, system 300 of FIG. 3, system 400 of FIG. 4, system 500 of system 5, system 600 of FIG. 6, system 700 of FIG. 7A and/or FIG. 7B, and/or system 800 of FIG. 8A and/or FIG. 8B, provide a variety of different examples of precipitators and/or separators in accordance with various embodiments, which may be examples of precipitator 130 of FIG. 1B and/or separator 140 of FIG. 1B. Variations of these systems may include, but are not limited to, utilizing at least a liquid thermocline, a priller, or a heat exchanger as a precipitator. For example, some embodiments may utilize at least an inert liquid thermocline, an inert forced gas priller, an inert natural draft priller, or an inhibited surface heat exchanger. In some embodiments, the precipitator may include one or more tanks or other containers. Variations of these systems include, but are not limited to, utilizing at least a direct contact membrane distiller, an ion exchanger, an activated carbon absorber, a flash separator, a multi-effect distiller, a vapor compression distiller, an evaporator, an air-gap membrane contractor, and/or a liquid-liquid extractor as a separator.

The aspects of the systems as described, such as system 100-*a* of FIG. 1A, system 100-*b* of FIG. 1B, system 100-*c* of FIG. 1C, system 200 of FIG. 2, system 300 of FIG. 3, system 400 of FIG. 4, system 500 of system 5, system 600 of FIG. 6, system 700 of FIG. 7A and/or FIG. 7B, and/or system 800 of FIG. 8A and/or FIG. 8B, along with their variations may provide: means for precipitating a first material, where a first heat is released from the precipitated first material; means for cooling the precipitated first material; means for dissolving the cooled precipitated first material into a second material to create a dissolved mixture, where a second heat is absorbed into the mixture; and/or means for separating the first material and the second material from the dissolved mixture. For example, a precipitator as described with respect to system 100-*a* of FIG. 1A, system 100-*b* of FIG. 1B, system 100-*c* of FIG. 1C, system 200 of FIG. 2, system 300 of FIG. 3, system 400 of FIG. 4, system 500 of system 5, system 600 of FIG. 6, system 700 of FIG. 7A and/or FIG. 7B, and/or system 800 of FIG. 8A and/or FIG. 8B, may provide: means for precipitating a first material, where a first heat is released from the precipitated first material; means for cooling the precipitated first material; means for dissolving the cooled precipitated first material into a second material to create a dissolved mixture, where a second heat is absorbed into the mixture. A separator as described with respect to system 100-*a* of FIG. 1A, system 100-*b* of FIG. 1B, system 100-*c* of FIG. 1C, system 200 of FIG. 2, system 300 of FIG. 3, system 400 of FIG. 4, system 500 of system 5, system 600 of FIG. 6, system 700 of FIG. 7A and/or FIG. 7B, and/or system 800 of FIG. 8A and/or FIG. 8B, may provide means for separating the first material and the second material from the dissolved mixture.

Figure 9A:
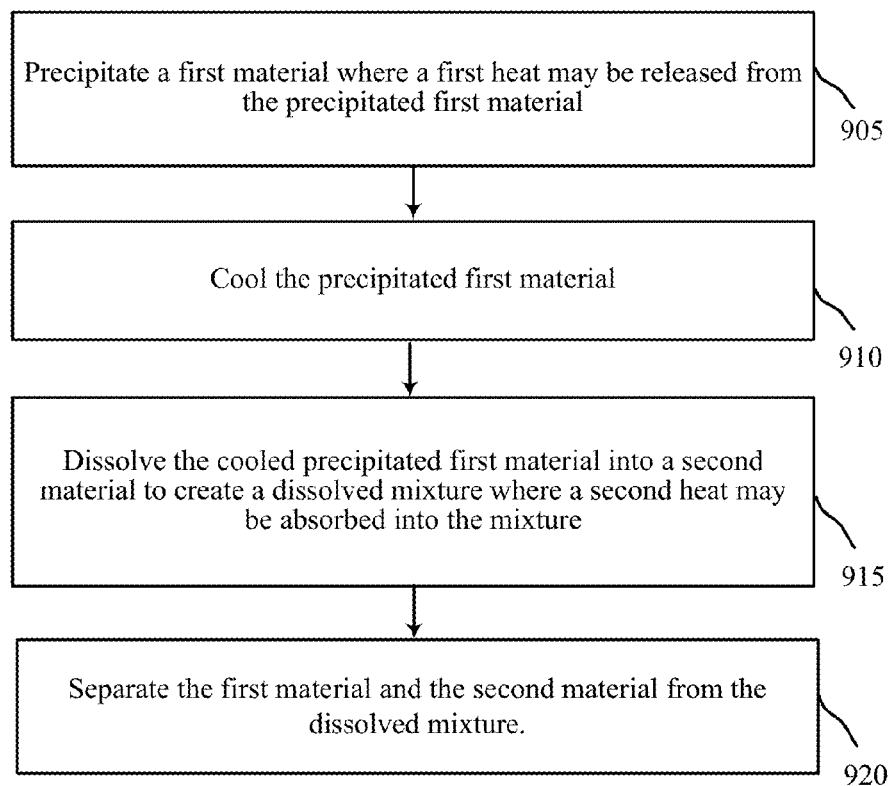
FIG. 9A shows a method flow diagram in accordance with various embodiments.

FIG. 9A shows a flow diagram of a method 900-*a* of producing a heat pump in accordance with various embodiments. For some embodiments, method 900-*a* may be implemented utilizing one or more aspects of a system such as system 100-a of FIG. 1A, system 100-b of FIG. 1B, system 100-c of FIG. 1C, system 200 of FIG. 2, system 300 of FIG. 3, system 400 of FIG. 4, system 500 of system 5, system 600 of FIG. 6, system 700 of FIG. 7A and/or FIG. 7B, and/or system 800 of FIG. 8A and/or FIG. 8B. Method 900-a may produce a heat pump utilizing a low temperature heat in some cases.

At block 905, a first material may be precipitated. Heat may be released from the precipitated first material. This heat may be referred to as a first heat in some embodiments. At block 910, the precipitated first material may be cooled. At block 915, the cooled precipitated first material may be dissolved into a second material to create a dissolved mixture. Heat may be absorbed into the mixture. This heat may be referred to as a second heat in some embodiments. At block 920, the first material and the second material may be separated from the dissolved mixture. Some embodiments of the method may include utilizing at least a portion of the dissolved mixture to perform the cooling of the precipitated first material.

In some embodiments of the method 900-a, the first material includes a refrigerant and the second material includes a solvent. The first material may be in thermal contact with an ambient environment when precipitating. The first material may be in thermal contact with a refrigerated environment when at least cooling or dissolving.

In some embodiments of the method 900-a, the precipitating utilizes at least a liquid thermocline, a priller, or a heat exchanger. For example, some embodiments may utilize at least an inert liquid thermocline, an inert forced gas priller, an inert natural draft priller, or an inhibited surface heat exchanger. The cooling may utilize a heat exchanger in some cases. For example, the cooling may utilize at least an indirect contact heat exchanger or a direct contact heat exchanger.

In some embodiments of the method 900-a, heat, such as the second heat, is absorbed into the dissolved mixture through removing heat from a refrigerated environment. This may be through at least direct thermal contact with a refrigerant or indirect thermal contract with a secondary heat transfer fluid. The separation may utilize a variety of different techniques including, but limited to, at least a membrane distillation, an ion exchange, an activated carbon absorption, a flash separation, a distillation, a multi-effect distillation, a vapor compression distillation, an evaporation, air-gap membrane extraction, or a liquid-liquid extraction.

In some embodiments of the method 900-a, the solvent includes at least water, alcohol, glycol, ammonia, DMSO, acetone, aqueous polymer, or polar solvent. In some cases, the solvent may include a combination of solvents, such as water and at least one other solvent. The refrigerant may include a hydrate forming salt. In some embodiments, the refrigerant includes at least $Na_2S_2CO_3$, $Na_2CO_3$, $NA_2Cr0_4$, or $KNO_3$.

Figure 9B:
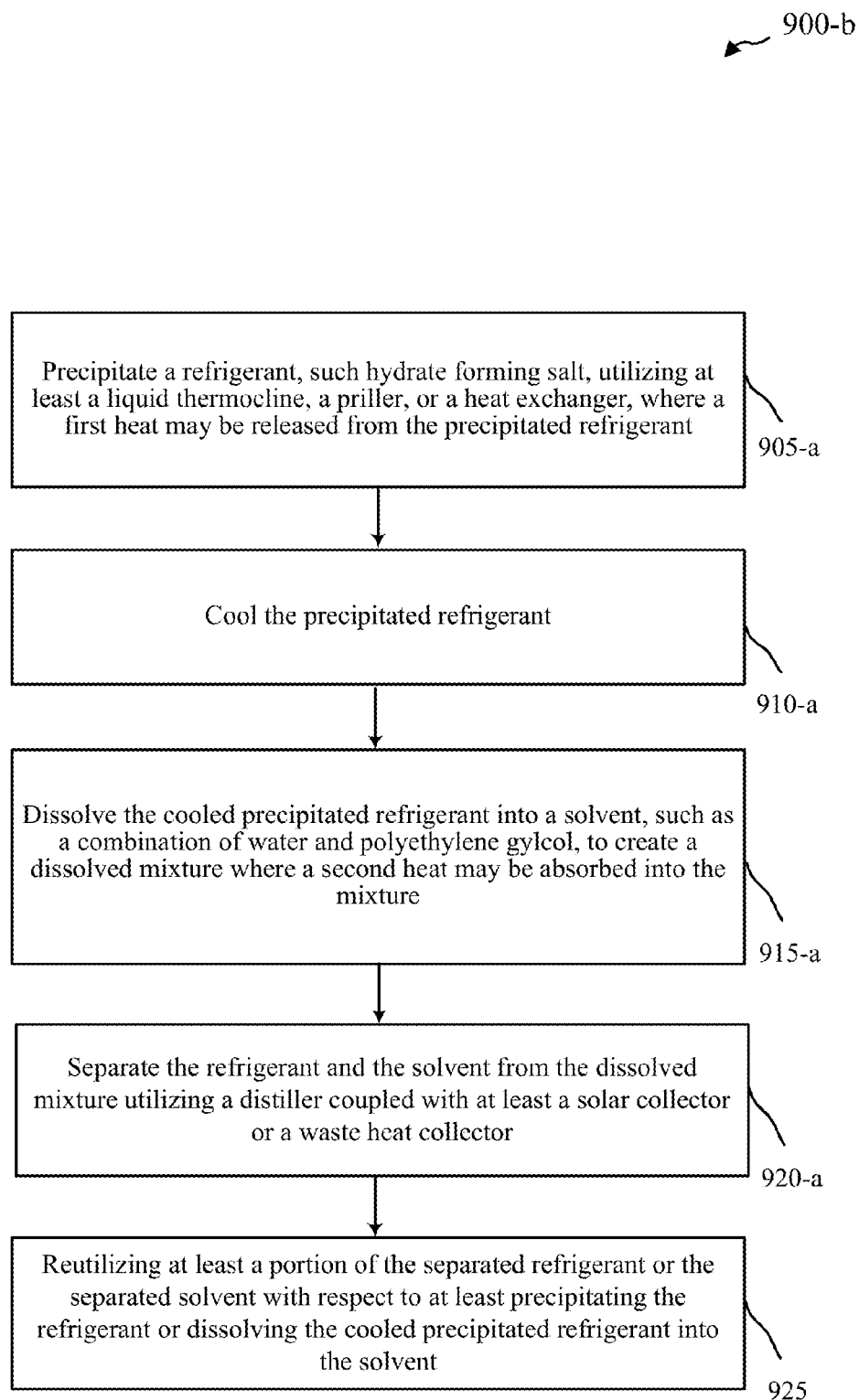
FIG. 9B shows a method flow diagram in accordance with various embodiments.

By way of example, FIG. 9B shows a specific example of a method 900-b of producing a heat pump in accordance with various embodiments. For some embodiments, method 900-b may be implemented utilizing one or more aspects of a system such as system 100-a of FIG. 1A, system 100-b of FIG. 1B, system 100-c of FIG. 1C, system 200 of FIG. 2, system 300 of FIG. 3, system 400 of FIG. 4, system 500 of system 5, system 600 of FIG. 6, system 700 of FIG. 7A and/or FIG. 7B, and/or system 800 of FIG. 8A and/or FIG. 8B. Method 900-b may produce a heat pump utilizing a low temperature heat in some cases. Method 900-b may be an example of method 900-a of FIG. 9B.

At block 905-a, a refrigerant such as a hydrate forming salt may be precipitated utilizing at least a liquid thermocline, a priller, or a heat exchanger. Heat may be released from the precipitated refrigerant. This heat may be referred to as a first heat in some embodiments. At block 910-a, the precipitated refrigerant may be cooled. At block 915-a, the cooled precipitated refrigerant may be dissolved into a solvent, such as a combination of water and polyethylene glycol, to create a dissolved mixture. Heat may be absorbed into the mixture. This heat may be referred to as a second heat in some embodiments. At block 920-a, the refrigerant and the solvent may be separated from the dissolved mixture utilizing a distiller coupled with at least a solar collector or a waste heat collector. Some embodiments of the method may include utilizing at least a portion of the dissolved mixture to perform the cooling of the precipitated refrigerant. At block 925, at least a portion of the separated refrigerant or the separated solvent may be reutilized with respect to at least precipitating the refrigerant or solving the cooled precipitated refrigerant into the solvent.

These embodiments may not capture the full extent of combination and permutations of materials and process equipment. However, they may demonstrate the range of applicability of the method, devices, and/or systems. The different embodiments may utilize more or less steps than those described. The different embodiments may also utilize aspects of each other.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as steps. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of steps may be undertaken before, during, or after the above elements are considered. Accordingly, the above description should not be taken as limiting the scope of the different embodiments.

The invention claimed is:

1. A method of producing a heat pump comprising:
   precipitating a first material, wherein a first heat is released from the precipitated first material;
   cooling the precipitated first material;

dissolving the cooled precipitated first material into a second material to create a dissolved mixture, wherein a second heat is absorbed into the dissolved mixture; and separating the first material and the second material from the dissolved mixture.

2. The method of claim 1, further comprising:
utilizing at least a portion of the dissolved mixture to perform the cooling of the precipitated first material.

3. The method of claim 1, wherein the first material comprises a refrigerant and the second material comprises a solvent.

4. The method of claim 3, wherein the solvent comprises at least water, alcohol, ammonia, DMSO, acetone, glycol, polyethylene glycol, aqueous polymer, or polar solvent.

5. The method of claim 3, wherein the solvent comprises water combined with at least another solvent.

6. The method of claim 3, wherein the refrigerant comprises a hydrate forming salt.

7. The method of claim 3, wherein the refrigerant comprises at least $Na_2CO_3$, $Na_2S_2CO_3$, $NA_2Cr04$, or $KNO3$.

8. The method of claim 1, wherein the first material is in thermal contact with an ambient environment when precipitating.

9. The method of claim 1, wherein the first material is in thermal contact with a refrigerated environment when at least cooling or dissolving.

10. The method of claim 1, wherein the precipitating utilizes at least a liquid thermocline, a priller, or a heat exchanger.

11. The method of claim 1, wherein the cooling utilizes at least a heat exchanger.

12. The method of claim 1, wherein the second heat is absorbed into the dissolved mixture through removing the second heat from a refrigerated environment.

13. The method of claim 1, wherein the separating utilizes at least a membrane distillation, an ion exchange, an activated carbon absorption, a flash separation, a distillation, a multi-effect distillation, a vapor compression distillation, an evaporation, an air-gap membrane extraction, or a liquid-liquid extraction.

14. A system for producing a heat pump comprising:
a precipitator configured to: precipitate a first material, wherein a first heat is released from the precipitated first material; cooling the precipitated first material; and
dissolve the cooled precipitated first material into a second material to create a dissolved mixture, wherein a second heat is absorbed into the dissolved mixture; and
a separator configured to separate the first material and the second material from the dissolved mixture.

15. The system of claim 14, wherein the first material comprises a refrigerant and the second material comprises a solvent.

16. The system of claim 14, wherein:
the precipitator comprises a heater exchanger configured to cool the precipitated first material; and
the separator comprises a distiller configured to separate the first material and the second material from the dissolved mixture.

17. The system of claim 16, wherein the precipitator further comprises a liquid thermocline configured to precipitate the first material, wherein the first heat is released from the precipitated first material.

18. The system of claim 16, wherein the precipitator further comprises a priller configured to precipitate the first material, wherein the first heat is released from the precipitated first material.

19. The system of claim 16, wherein the distiller comprises at least a direct contact membrane distiller, an ion exchanger, an activated carbon absorber, a flash separator, a multi-effect distiller, a vapor compression distiller, an evaporator, an air-gap membrane contractor, or a liquid-liquid extractor.

20. The system of claim 15, wherein the precipitator comprises one or more tanks, wherein at least one of the tanks includes one or more faceted surface areas.

* * * * *